United States Patent
Jacobson et al.

(10) Patent No.: US 9,843,816 B2
(45) Date of Patent: Dec. 12, 2017

(54) SYSTEM AND METHOD FOR CODING IN PATTERN MODE FOR DISPLAY STREAM COMPRESSION (DSC)

(71) Applicant: QUALCOMM Incorporated, San Diego, CA (US)

(72) Inventors: Natan Haim Jacobson, San Diego, CA (US); Vijayaraghavan Thirumalai, San Diego, CA (US); Rajan Laxman Joshi, San Diego, CA (US); Min Dai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 255 days.

(21) Appl. No.: 14/691,376

(22) Filed: Apr. 20, 2015

(65) Prior Publication Data

US 2015/0304668 A1    Oct. 22, 2015

Related U.S. Application Data

(60) Provisional application No. 61/982,211, filed on Apr. 21, 2014, provisional application No. 62/009,814, (Continued)

(51) Int. Cl.
*H04N 19/10*    (2014.01)
*H04N 19/196*    (2014.01)
(Continued)

(52) U.S. Cl.
CPC ......... *H04N 19/196* (2014.11); *H04N 19/167* (2014.11); *H04N 19/593* (2014.11); *H04N 19/94* (2014.11)

(58) Field of Classification Search
None
See application file for complete search history.

(56) References Cited

U.S. PATENT DOCUMENTS 5,737,537 A * 4/1998 Gardos ............... H04N 19/503
358/539
8,599,214 B1  12/2013 Dall et al.
(Continued)

OTHER PUBLICATIONS

Walls F., et al., "BDC-1: A robust algorithm for display stream compression", 2013 Picture Coding Symposium (PCS), IEEE, Dec. 8, 2013 (Dec. 8, 2013), pp. 434-437, XP032567035, DOI: 10.1109/PCS.2013.6737776 [retrieved on Feb. 11, 2014].
(Continued)

*Primary Examiner* — Mohammed Rahaman
(74) *Attorney, Agent, or Firm* — Knobbe, Martens, Olson & Bear, LLP

(57) ABSTRACT

A system and method for coding video data in pattern mode for display stream compression (DSC) is disclosed. In one aspect, the method includes determining that a first pattern in a current block of video data is not in a pattern database comprising a plurality of patterns, and adding the first pattern to the pattern database. The first pattern may be associated with a first index identifying a location of the first pattern in the pattern database. The method further includes coding the current block in pattern mode at least in part via signaling (i) the first pattern determined not to be in the pattern database and (ii) the first index identifying the location of the first pattern in the first database.

30 Claims, 12 Drawing Sheets

Related U.S. Application Data filed on Jun. 9, 2014, provisional application No. 62/035,178, filed on Aug. 8, 2014, provisional application No. 62/093,340, filed on Dec. 17, 2014.

(51) Int. Cl.
*H04N 19/167* (2014.01)
*H04N 19/593* (2014.01)
*H04N 19/94* (2014.01)

(56) References Cited

U.S. PATENT DOCUMENTS

| | | | |
|---|---|---|---|
| 2002/0191224 A1* | 12/2002 | Yagishita | H04N 1/4105 358/426.07 |
| 2009/0003692 A1* | 1/2009 | Pettersson | G06T 9/005 382/166 |
| 2009/0097759 A1* | 4/2009 | Chang | H04N 19/46 382/232 |
| 2013/0010864 A1* | 1/2013 | Teng | H04N 19/176 375/240.12 |

OTHER PUBLICATIONS

International Search Report and Written Opinion—PCT/US2015/026865—ISA/EPO—dated Jul. 2, 2015.

\* cited by examiner

SYSTEM AND METHOD FOR CODING IN PATTERN MODE FOR DISPLAY STREAM COMPRESSION (DSC)

INCORPORATION BY REFERENCE TO PRIORITY APPLICATIONS

This application claims the benefit of U.S. Provisional Application No. 61/982,211, filed Apr. 21, 2014, U.S. Provisional Application No. 62/009,814, filed Jun. 9, 2014, U.S. Provisional Application No. 62/035,178, filed Aug. 8, 2014, and U.S. Provisional Application No. 62/093,340, filed Dec. 17, 2014.

TECHNICAL FIELD

This disclosure relates to the field of video coding and compression, and particularly to video compression for transmission over display links, such as display stream compression (DSC).

BACKGROUND

Digital video capabilities can be incorporated into a wide range of displays, including digital televisions, personal digital assistants (PDAs), laptop computers, desktop monitors, digital cameras, digital recording devices, digital media players, video gaming devices, video game consoles, cellular or satellite radio telephones, video teleconferencing devices, and the like. Display links are used to connect displays to appropriate source devices. The bandwidth requirements of display links are proportional to the resolution of the displays, and thus, high-resolution displays require large bandwidth display links. Some display links do not have the bandwidth to support high resolution displays. Video compression can be used to reduce the bandwidth requirements such that lower bandwidth display links can be used to provide digital video to high resolution displays.

Others have tried to utilize image compression on the pixel data. However, such schemes are sometimes not visually lossless or can be difficult and expensive to implement in conventional display devices.

The Video Electronics Standards Association (VESA) has developed display stream compression (DSC) as a standard for display link video compression. The display link video compression technique, such as DSC, should provide, among other things, picture quality that is visually lossless (i.e., pictures having a level of quality such that users cannot tell the compression is active). The display link video compression technique should also provide a scheme that is easy and inexpensive to implement in real-time with conventional hardware.

SUMMARY

The systems, methods and devices of this disclosure each have several innovative aspects, no single one of which is solely responsible for the desirable attributes disclosed herein.

In one aspect, a method for coding video data in pattern mode includes: determining that a first pattern in a current block of the video data is not in a pattern database comprising a plurality of patterns, wherein the pattern database is stored in a memory of a video encoding device; adding the first pattern to the pattern database, the first pattern being associated with a first index identifying a location of the first pattern in the pattern database; and coding the current block in pattern mode at least in part via signaling (i) the first pattern determined not to be in the pattern database and (ii) the first index identifying the location of the first pattern in the first database.

In another aspect, an apparatus configured to code video data in pattern mode includes a memory and a processor in communication with the memory. The memory is configured to store a pattern database comprising a plurality of patterns. The processor is configured to: determine that a first pattern in a current block of the video data is not in the pattern database; add the first pattern to the pattern database, the first pattern being associated with a first index identifying a location of the first pattern in the pattern database; and code the current block in pattern mode at least in part via signaling (i) the first pattern determined not to be in the pattern database and (ii) the first index identifying the location of the first pattern in the first database.

In another aspect, a non-transitory computer readable medium contains code that, when executed, causes an apparatus to: determine that a first pattern in a current block of video data is not in a pattern database comprising a plurality of patterns; add the first pattern to the pattern database, the first pattern being associated with a first index identifying a location of the first pattern in the pattern database; and code the current block in pattern mode at least in part via signaling (i) the first pattern determined not to be in the pattern database and (ii) the first index identifying the location of the first pattern in the first database.

In another aspect, a video coding device configured to code video data in pattern mode includes: means for determining that a first pattern in a current block of the video data is not in a pattern database comprising a plurality of patterns; means for adding the first pattern to the pattern database, the first pattern being associated with a first index identifying a location of the first pattern in the pattern database; and means for coding the current block in pattern mode at least in part via signaling (i) the first pattern determined not to be in the pattern database and (ii) the first index identifying the location of the first pattern in the first database.

DETAILED DESCRIPTION

Figure 1A:
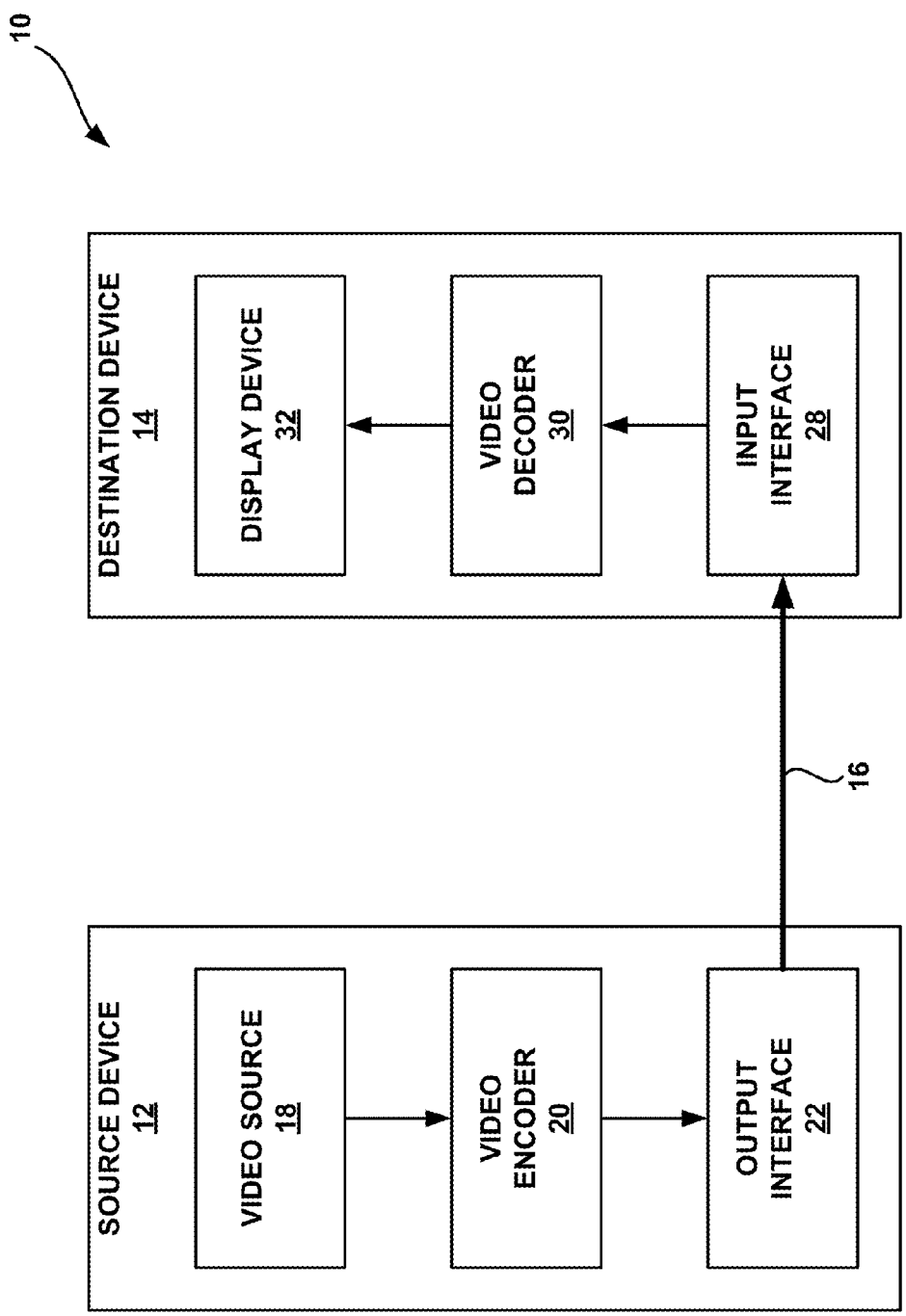
FIG. 1A is a block diagram illustrating an example video encoding and decoding system that may utilize techniques in accordance with aspects described in this disclosure.

In general, this disclosure relates to methods of improving video compression techniques such as DSC. More specifically, the present disclosure relates to systems and methods for searching a pattern database for a potential match and updating the pattern database when a match is not found in the pattern database.

While certain embodiments are described herein in the context of the DSC standard, one having ordinary skill in the art would appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) Moving Picture Experts Group-1 (MPEG-1) Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), High Efficiency Video Coding (HEVC), and any extensions to such standards. Also, the techniques described in this disclosure may become part of standards developed in the future. In other words, the techniques described in this disclosure may be applicable to previously developed video coding standards, video coding standards currently under development, and forthcoming video coding standards.

The proposed algorithm for the future DSC standard includes a number of coding modes in which each block of video data may be encoded by an encoder and, similarly, decoded by a decoder. In some implementations, the encoder and the decoder may maintain a database of frequently used pixel values, and (e.g., encoder may signal, and decoder may reference) database indices instead of actual pixel values, which may be more costly to signal. However, some of such implementations may require that each pixel contained in the block be present in the database before coding the block in such a coding mode. Further, other implementations may require a costly database update process involving a search through the database on the encoder side as well as the decoder side. Thus, an improved method of implementing a pattern database is desired.

In the present disclosure, an improved method of coding a block in pattern mode is described. For example, the method may not require that each pixel in the current block being coded to be present in the database. In addition, the method may not require an exact match between pixels in the current block and the pixels stored in the database. Further, the process of updating the pattern database according to the present disclosure may not require a search by the decoder through the pattern database, leading to a simpler hardware design.

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), and HEVC including extensions of such standards.

In addition, a video coding standard, namely DSC, has been developed by VESA. The DSC standard is a video compression standard which can compress video for transmission over display links. As the resolution of displays increases, the bandwidth of the video data required to drive the displays increases correspondingly. Some display links may not have the bandwidth to transmit all of the video data to the display for such resolutions. Accordingly, the DSC standard specifies a compression standard for interoperable, visually lossless compression over display links.

The DSC standard is different from other video coding standards, such as H.264 and HEVC. DSC includes intra-frame compression, but does not include inter-frame compression, meaning that temporal information may not be used by the DSC standard in coding the video data. In contrast, other video coding standards may employ inter-frame compression in their video coding techniques.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
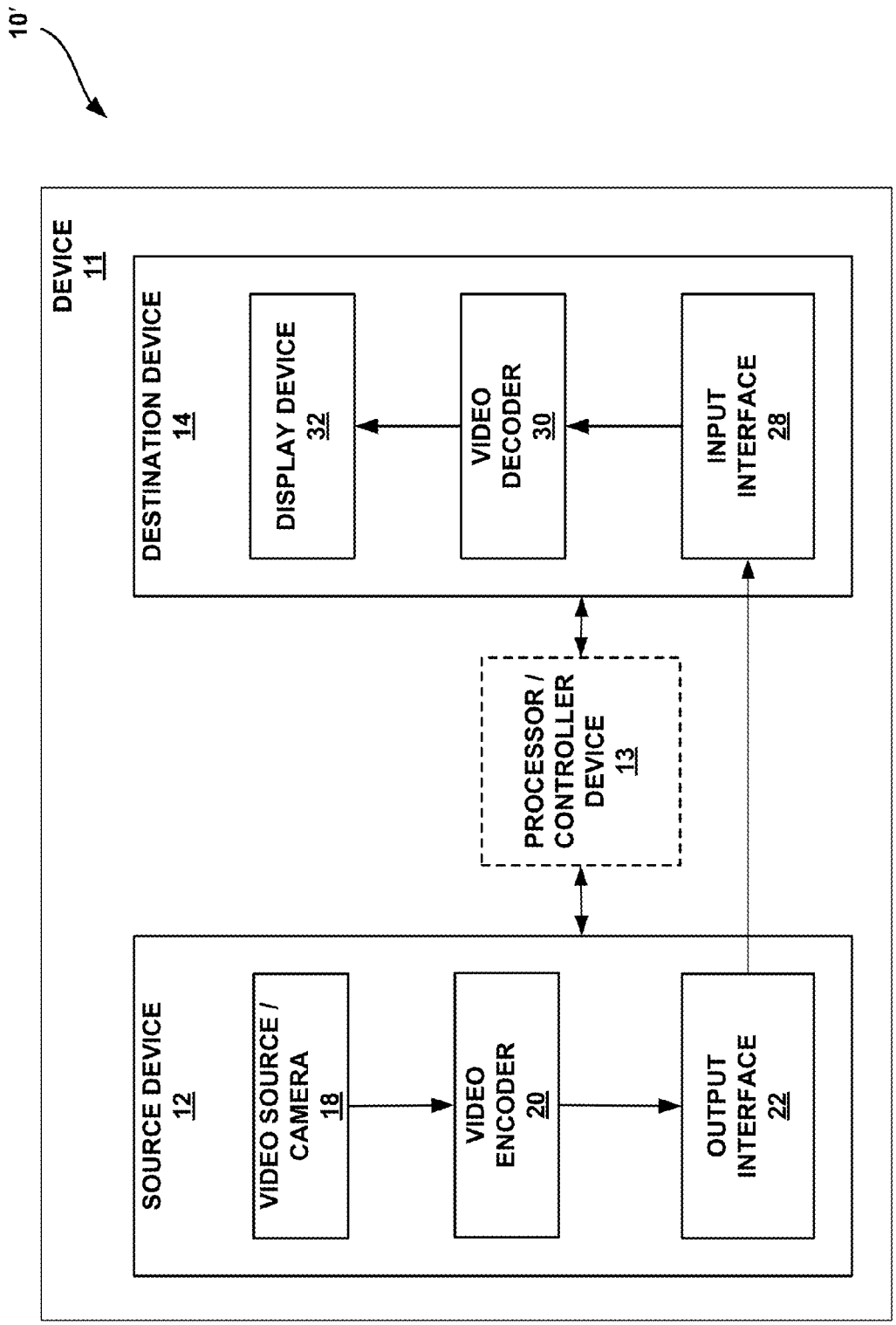
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated in FIG. 2B or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a processor/controller device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as DSC. Alternatively, the video encoder 20 and the video decoder 30 may operate according to other proprietary or industry standards, such as the ITU-T H.264 standard, alternatively referred to as MPEG-4, Part 10, AVC, HEVC or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include a set of coding parameters such as a quantization parameter (QP). To generate a coded picture, the video encoder 20 may partition a picture into equally-sized video blocks. A video block may be a two-dimensional array of samples. The coding parameters may define a coding option (e.g., a coding mode) for every block of the video data. The coding option may be selected in order to achieve a desired rate-distortion performance.

In some examples, the video encoder 20 may partition a picture into a plurality of slices. Each of the slices may include a spatially distinct region in an image (e.g., a frame) that can be decoded independently without information from the rest of the regions in the image or frame. Each image or video frame may be encoded in a single slice or it may be encoded in several slices. In DSC, the target bits allocated to encode each slice may be substantially constant. As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

DSC Video Encoder

Figure 2A:
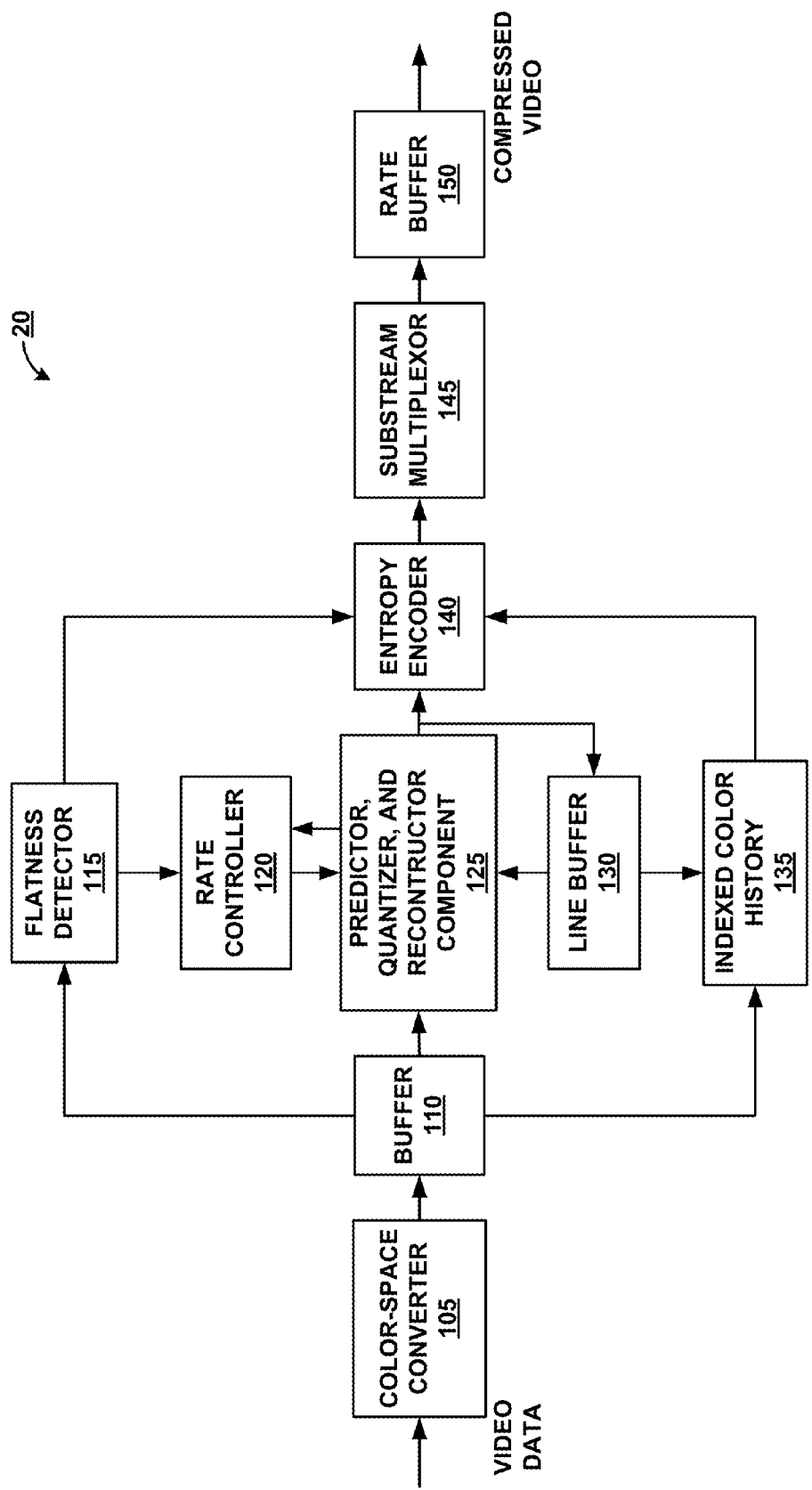
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to perform some or all of the techniques of this disclosure. In some examples, the techniques described in this disclosure may be shared among the various components of the video encoder 20. In some examples, additionally or alternatively, a processor (not shown) may be configured to perform some or all of the techniques described in this disclosure.

For purposes of explanation, this disclosure describes the video encoder 20 in the context of DSC coding. However, the techniques of this disclosure may be applicable to other coding standards or methods.

In the example of FIG. 2A, the video encoder 20 includes a plurality of functional components. The functional components of the video encoder 20 include a color-space converter 105, a buffer, 110, a flatness detector 115, a rate controller 120, a predictor, quantizer, and reconstructor component 125, a line buffer 130, an indexed color history 135, an entropy encoder 140, a substream multiplexor 145, and a rate buffer 150. In other examples, the video encoder 20 may include more, fewer, or different functional components.

The color-space 105 converter may convert an input color-space to the color-space used in the coding implementation. For example, in one exemplary embodiment, the color-space of the input video data is in the red, green, and blue (RGB) color-space and the coding is implemented in the luminance Y, chrominance green Cg, and chrominance orange Co (YCgCo) color-space. The color-space conversion may be performed by method(s) including shifts and additions to the video data. It is noted that input video data in other color-spaces may be processed and conversions to other color-spaces may also be performed.

In related aspects, the video encoder 20 may include the buffer 110, the line buffer 130, and/or the rate buffer 150. For example, the buffer 110 may hold the color-space converted video data prior to its use by other portions of the video encoder 20. In another example, the video data may be stored in the RGB color-space and color-space conversion may be performed as needed, since the color-space converted data may require more bits.

The rate buffer 150 may function as part of the rate control mechanism in the video encoder 20, which will be described in greater detail below in connection with rate controller 120. The bits spent on encoding each block can vary highly substantially based on the nature of the block. The rate buffer 150 can smooth the rate variations in the compressed video. In some embodiments, a constant bit rate (CBR) buffer model is employed in which bits are taken out from the buffer at a constant bit rate. In the CBR buffer model, if the video encoder 20 adds too many bits to the bitstream, the rate buffer 150 may overflow. On the other hand, the video encoder 20 must add enough bits in order to prevent underflow of the rate buffer 150.

On the video decoder side, the bits may be added to rate buffer 155 of the video decoder 30 (see FIG. 2B which is described in further detail below) at a constant bit rate, and the video decoder 30 may remove variable numbers of bits for each block. To ensure proper decoding, the rate buffer 155 of the video decoder 30 should not "underflow" or "overflow" during the decoding of the compressed bit stream.

In some embodiments, the buffer fullness (BF) can be defined based on the values BufferCurrentSize representing the number of bits currently in the buffer and BufferMaxSize representing the size of the rate buffer 150, i.e., the maximum number of bits that can be stored in the rate buffer 150 at any point in time. The BF may be calculated as:

BF=((BufferCurrentSize*100)/BufferMaxSize)

The flatness detector 115 can detect changes from complex (i.e., non-flat) areas in the video data to flat (i.e., simple or uniform) areas in the video data. The terms "complex" and "flat" will be used herein to generally refer to the difficulty for the video encoder 20 to encode the respective regions of the video data. Thus, the term complex as used herein generally describes a region of the video data as being complex for the video encoder 20 to encode and may, for example, include textured video data, high spatial frequency, and/or other features which are complex to encode. The term flat as used herein generally describes a region of the video data as being simple for the video encoder 20 to encoder and may, for example, include a smooth gradient in the video data, low spatial frequency, and/or other features which are simple to encode. The transitions between complex and flat regions may be used by the video encoder 20 to reduce quantization artifacts in the encoded video data. Specifically, the rate controller 120 and the predictor, quantizer, and reconstructor component 125 can reduce such quantization artifacts when the transitions from complex to flat regions are identified.

The rate controller 120 determines a set of coding parameters, e.g., a QP. The QP may be adjusted by the rate controller 120 based on the buffer fullness of the rate buffer 150 and image activity of the video data in order to maximize picture quality for a target bitrate which ensures that the rate buffer 150 does not overflow or underflow. The rate controller 120 also selects a particular coding option (e.g., a particular mode) for each block of the video data in order to achieve the optimal rate-distortion performance. The rate controller 120 minimizes the distortion of the reconstructed images such that it satisfies the bit-rate constraint, i.e., the overall actual coding rate fits within the target bit rate.

The predictor, quantizer, and reconstructor component 125 may perform at least three encoding operations of the video encoder 20. The predictor, quantizer, and reconstructor component 125 may perform prediction in a number of different modes. One example predication mode is a modified version of median-adaptive prediction. Median-adaptive prediction may be implemented by the lossless JPEG standard (JPEG-LS). The modified version of median-adaptive prediction which may be performed by the predictor, quantizer, and reconstructor component 125 may allow for parallel prediction of three consecutive sample values. Another example prediction mode is block prediction. In block prediction, samples are predicted from previously reconstructed pixels in the line above or to the left in the same line. In some embodiments, the video encoder 20 and the video decoder 30 may both perform an identical search on reconstructed pixels to determine the block prediction usages, and thus, no bits need to be sent in the block prediction mode. In other embodiments, the video encoder 20 may perform the search and signal block prediction vectors in the bitstream, such that the video decoder 30 need not perform a separate search. A midpoint prediction mode may also be implemented in which samples are predicted using the midpoint of the component range. The midpoint prediction mode may enable bounding of the number of bits required for the compressed video in even the worst-case sample. As further discussed below with reference to FIGS. 3-6, the predictor, quantizer, and reconstructor component 125 may be configured to predict (e.g., encode or decode) the block of video data (or any other unit of prediction) by performing the methods illustrated in FIGS. 3-6.

The predictor, quantizer, and reconstructor component 125 also performs quantization. For example, quantization may be performed via a power-of-2 quantizer which may be implemented using a shifter. It is noted that other quantization techniques may be implemented in lieu of the power-of-2 quantizer. The quantization performed by the predictor, quantizer, and reconstructor component 125 may be based on the QP determined by the rate controller 120. Finally, the predictor, quantizer, and reconstructor component 125 also performs reconstruction which includes adding the inverse quantized residual to the predicted value and ensuring that the result does not fall outside of the valid range of sample values.

It is noted that the above-described example approaches to prediction, quantization, and reconstruction performed by the predictor, quantizer, and reconstructor component 125 are merely illustrative and that other approaches may be implemented. It is also noted that the predictor, quantizer, and reconstructor component 125 may include subcomponent(s) for performing the prediction, the quantization, and/or the reconstruction. It is further noted that the prediction, the quantization, and/or the reconstruction may be performed by several separate encoder components in lieu of the predictor, quantizer, and reconstructor component 125.

The line buffer 130 holds the output from the predictor, quantizer, and reconstructor component 125 so that the predictor, quantizer, and reconstructor component 125 and the indexed color history 135 can use the buffered video data. The indexed color history 135 stores recently used pixel values. These recently used pixel values can be referenced directly by the video encoder 20 via a dedicated syntax.

The entropy encoder 140 encodes the prediction residuals and any other data (e.g., indices identified by the predictor, quantizer, and reconstructor component 125) received from the predictor, quantizer, and reconstructor component 125 based on the indexed color history 135 and the flatness transitions identified by the flatness detector 115. In some examples, the entropy encoder 140 may encode three samples per clock per substream encoder. The substream multiplexor 145 may multiplex the bitstream based on a headerless packet multiplexing scheme. This allows the video decoder 30 to run three entropy decoders in parallel, facilitating the decoding of three pixels per clock. The substream multiplexor 145 may optimize the packet order so that the packets can be efficiently decoded by the video decoder 30. It is noted that different approaches to entropy coding may be implemented, which may facilitate the decoding of power-of-2 pixels per clock (e.g., 2 pixels/clock or 4 pixels/clock).

DSC Video Decoder

Figure 2B:
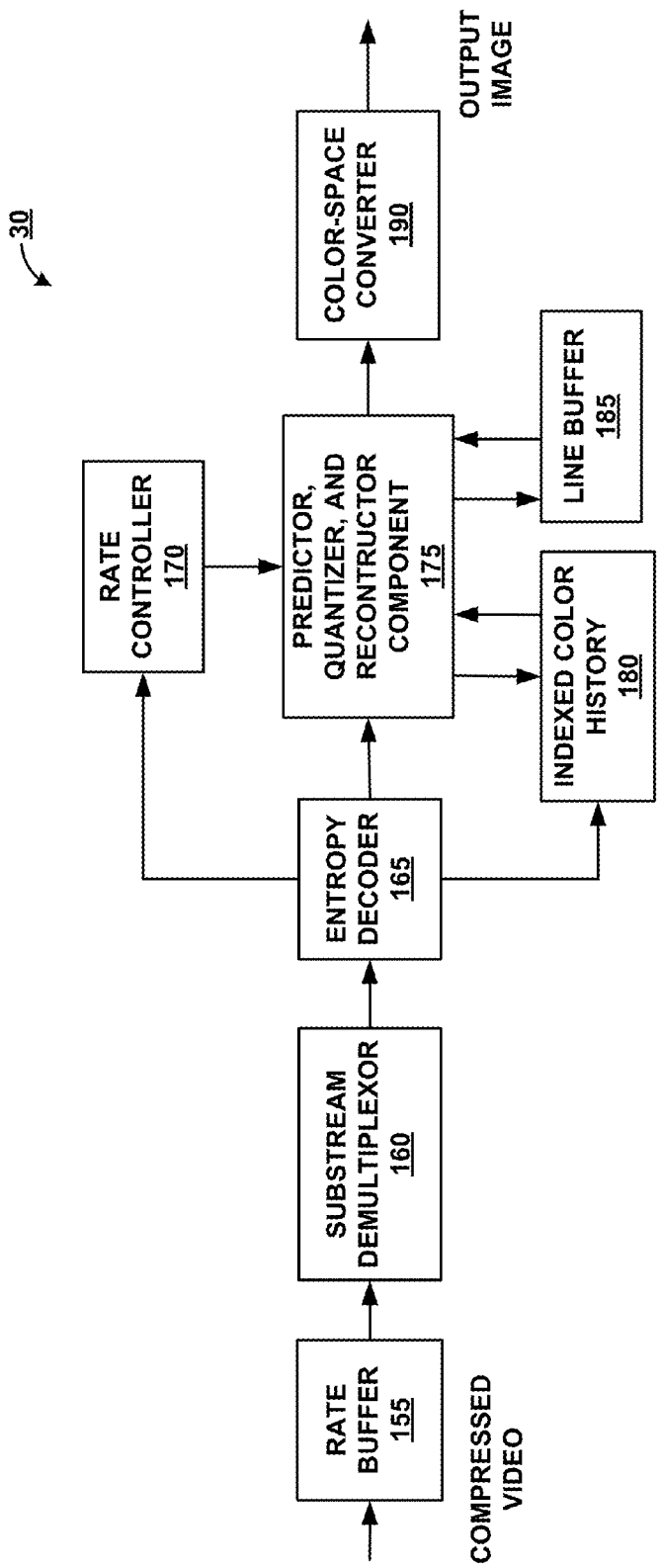
FIG. 2B is a block diagram illustrating an example of a video decoder that may implement techniques in accordance with aspects described in this disclosure.

FIG. 2B is a block diagram illustrating an example of the video decoder 30 that may implement techniques in accordance with aspects described in this disclosure. The video decoder 30 may be configured to perform some or all of the techniques of this disclosure. In some examples, the techniques described in this disclosure may be shared among the various components of the video encoder 30. In some examples, additionally or alternatively, a processor (not shown) may be configured to perform some or all of the techniques described in this disclosure.

For purposes of explanation, this disclosure describes the video decoder 30 in the context of DSC coding. However, the techniques of this disclosure may be applicable to other coding standards or methods.

In the example of FIG. 2B, the video decoder 30 includes a plurality of functional components. The functional components of the video decoder 30 include a rate buffer 155, a substream demultiplexor 160, an entropy decoder 165, a rate controller 170, a predictor, quantizer, and reconstructor component 175, an indexed color history 180, a line buffer 185, and a color-space converter 190. The illustrated components of the video decoder 30 are analogous to the corresponding components described above in connection with the video encoder 20 in FIG. 2A. As such, each of the components of the video decoder 30 may operate in a similar fashion to the corresponding components of the video encoder 20 as described above.

Slices in DSC

As noted above, a slice generally refers to a spatially distinct region in an image or a frame that can be decoded independently without using the information from the rest of the regions in the image or frame. Each image or video frame may be encoded in a single slice or it may be encoded in several slices. In DSC, the target bits allocated to encode each slice may be substantially constant.

Pattern Mode

A single block of video data may contain a number of pixels, and each block of video data has a number of potential coding modes in which the block can be coded. One of such coding modes is pattern mode. In pattern mode, the encoder and the decoder may maintain a database of pixel values (e.g., pattern database) that have recently been coded. When encoding a block of video data, the encoder may determine that each pattern (e.g., RGB values of a single pixel) contained in the block is present in the pattern database, and signal to the decoder the indices of the matching patterns (i.e., patterns of the pattern database that match the patterns contained in the block) in the pattern database instead of the actual pixel values contained in the block. Pattern mode may be particularly useful for compressing graphics content, since such content (e.g., content associated with a desktop user interface) typically contains a lot of pixel values that are the same (i.e., redundant pixel values).

In some implementations, the pattern mode may employ a persistent database of recently-occurring and spatially neighboring pixel values, which is updated for each pattern block. Good coding efficiency is provided when a given block to be encoded has most of its pixel values contained in the database. In this case, the index in the database associated with each pixel value contained in the database can be transmitted rather than transmitting the pixel value itself thus providing a significant bitrate savings over the implementations that require each pixel value to be signaled. For example, if the pattern database size is 32 possible pattern entries, then each pixel can be encoded using a $\log_2(32)$=5-bit index.

Use of Pattern Mode

In some embodiments of the present disclosure, a block of video data may be coded in pattern mode even if the pattern database does not contain each pattern contained in the block. For example, if the current block has 8 patterns, and only 5 of the patterns are found in the pattern database, the encoder may still code the block in pattern mode and signal the database indices for the 5 patterns that were found in the pattern database and signal the actual pixel values of the remaining 3 patterns. In some cases, the encoder may code the block in pattern mode if the number of unique patterns not found in the pattern database is less than a threshold value. For example, if the block contains 8 pixels that are not found in the pattern database but all have the same pixel value, the encoder may code the block in pattern mode if the maximum number of new patterns that may be added to the pattern database for a single block is at least 1. The use of the pattern mode may be signaled (i.e. indicated) using a flag. In other words, a flag may be used to indicate the enablement (or disablement) of pattern mode.

In some embodiments of the present disclosure, an exact match (e.g., have the same RGB values) between the pattern in the current block and the pattern in the pattern database is not required. The threshold amount of difference (or loss) may be based on one or more coding parameters such as QP. For example, in some embodiments of the present disclosure, pattern mode may be used in either a lossless setting or a lossy setting. If the lossy setting is selected, the threshold amount of loss in the pattern mode can be computed as a function of the codec's current QP. The threshold amount of loss may be directly proportional to the current QP.

Information Signaled in Pattern Mode

In some embodiments of the present disclosure, the encoder may signal one or more data explicitly in the bitstream. Such data may include (i) the number of new patterns, (ii) new pattern values, and/or (iii) database indices of the repeated patterns that are already in the pattern database. In some embodiments of the present disclosure, all of (i)-(iii) are signaled explicitly in the bitstream (rather than being derived or determined based on other values signaled in the bitstream). By maximizing work done at the encoder (e.g., searching through the pattern database, determining which patterns in the current block are new, determining which patterns in the current block are present in the database, etc.), the decoder complexity can be minimized. This is important because often the hardware capability of the encoder far outweighs the capabilities of the decoder. As described above, pattern mode may be used in a lossless manner or a lossy manner. In the lossless approach, the new pattern may be signaled in its entirety using the source bit depth of the pattern. For example, for RGB888 data, the new pattern may be signaled to the decoder using 24 bits. In the lossy approach, the new pattern may be quantized by an amount based on the current QP value. For example, for a high QP, fewer than 24 bits may be signaled explicitly to the decoder.

In some embodiments of the present disclosure, the process of updating the pattern database does not require a search through the database on the decoder side. This leads to a simple hardware design.

Example Pattern Database

In some implementations, the pattern database may be partitioned into three fields: persistent, neighbors, and new. The persistent portion may include a number of unique patterns that have most recently been used by the encoder. The neighbors portion may include the patterns of the neighboring pixels and/or blocks. The new portion may include newly added patterns. For example, the maximum number of new patterns per block will determine the maximum rate of a pattern mode block. In addition, a trade-off can be made between the size of the persistent and neighbor database partitions. The neighbor database may be set as a function of the current block size.

After each pattern mode block is encoded, the set of new and neighboring pattern indices are added to the persistent database. In one implementation of the pattern mode, the persistent database may be a first-in first-out (FIFO) buffer.

An implementation of the pattern mode may remove duplicates when adding patterns back to the persistent database. In a more complex implementation of the pattern mode, the persistent database may be filled using a Most Recently Used (MRU) caching strategy.

The neighbors portion of the pattern database may be updated for each block (e.g., after each block is processed), and contains the current block's spatial neighbors (obtained from the previous reconstructed line). The left neighbor of the current block may or may not be added to the pattern database depending on the overall codec implementation. For example, the left neighbor may need to be removed to guarantee proper pipelining and reduce hardware complexity.

The new portion of the pattern database contains new patterns that are being added to the pattern database. As discussed above, a certain number of new patterns are allowed per block. Each entry that is added to the pattern database may also be signaled explicitly in the bitstream so that the decoder can update the pattern database on the decoder side accordingly.

In some embodiments of the present disclosure, the neighbors portion of the pattern database may be removed, such that the pattern database consists of persistent and new portions (e.g., respectively containing persistent patterns and new patterns). For example, such embodiments may be implemented if the total pattern database size is small, and the inclusion of neighboring patterns would reduce the size of the persistent portion of the pattern database beyond a certain threshold (e.g., too small to be effective or useful). Further, in other embodiments of the present disclosure, the pattern database contains a single portion (e.g., persistent portion). An example of such embodiments is described in greater detail with reference to FIG. 6.

Example Pattern Stored in the Pattern Database

In the present disclosure, the actual values stored in the pattern database are referred to as patterns, and may be defined as follows for 8-bit source content:

$$PAT(R,G,B)=R+(G<<8)=(B<<16)$$

For 10-bit content, the bit-shifts for G and B may be increased to 10 and 20, respectively.

Match Determination

In some implementations of the present disclosure, a small delta may be achieved when searching the pattern database for a match for a given pixel to be encoded. For example, if the current pixel to be encoded is (R, G, B) and a specific pattern in the database is $(R_p, G_p, B_p)$, the encoder may determine that there is a match between the current pixel and the specific pattern in the database as long as the pixel to be encoded and the database pattern satisfy the following constraints for two thresholds $T_0$ and $T_1$, where $T_1 \geq T_0$:

$$|R-R_p|<T_0$$

$$|G-G_p|<T_0$$

$$|B-B_p|<T_0$$

$$|R-R_p|+|G-G_p|+|B-B_p|<T_1$$

In some embodiments of the present disclosure, the above constraints for strict comparison may be relaxed to include equality. For example, the constraint $|R-R_p|<T_0$ may be replaced with $|R-R_p| \leq T_0$. The same may be done for the other constraints.

In one embodiment of the proposed algorithm, the thresholds above are determined as a function of the codec's current QP:

$$T_0=((QP-A)>>B)+C$$

$$T_1=2 \cdot T_0$$

where A, B, C are all parameters to be tuned during implementation. In this embodiment, the distortion allowed in pattern mode increases gradually in response to the codec's overall QP.

Example Flowchart for Searching a Pattern Database

Figure 3:
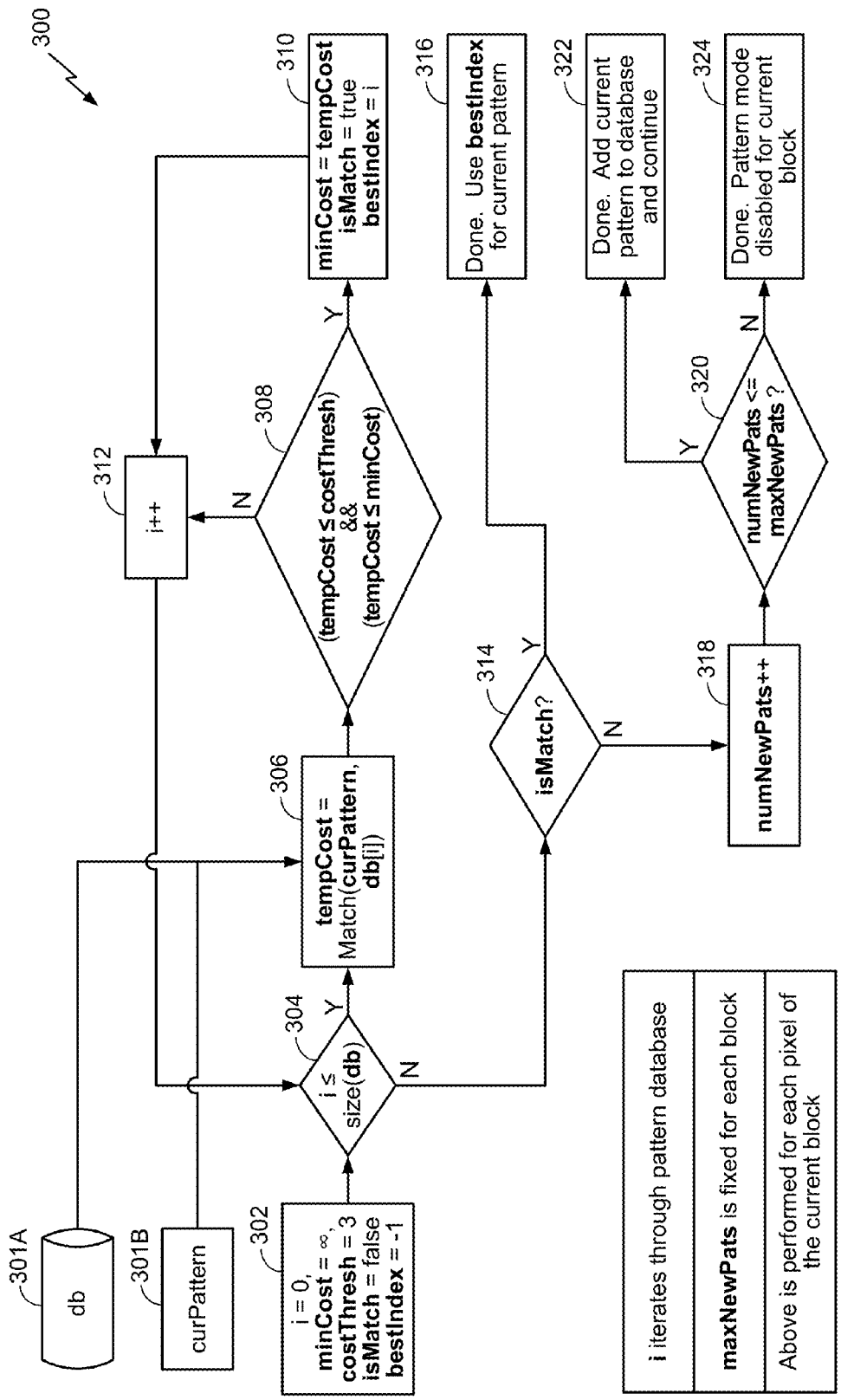
FIG. 3 is a flowchart illustrating a method for searching a pattern database in accordance with aspects described in this disclosure.

With reference to FIG. 3, an example procedure for searching a pattern database will be described. The steps illustrated in FIG. 3 may be performed by a video encoder (e.g., the video encoder 20 in FIG. 2A), a video decoder (e.g., the video decoder 30 in FIG. 2B), or component(s) thereof. For convenience, method 300 is described as performed by a video coder (also simply referred to as coder), which may be the video encoder 20, the video decoder 30, or another component.

The method 300 begins at block 302. At block 302, various parameters used in the method 300 are initialized. As illustrated in FIG. 3, the coder searches the database 301A for a current pattern 301B. At block 304, the coder determines whether the coder has finished going through the pattern database 301A. If the coder determines that the coder has not finished going through the pattern database 301A, the coder proceeds to block 306, where the coder determines the difference between the current pattern and the current database entry. Otherwise, the coder proceeds to block 314.

At block 308, the coder determines whether the difference between the current pattern and the current database entry satisfies one or more threshold criteria (e.g., that the difference is less than a threshold and also less than the smallest difference value found so far). If the coder determines that the one or more threshold criteria are satisfied, the coder proceeds to block 310, where the coder designates the difference as the lowest difference so far. Otherwise, the coder proceeds to block 312, where the coder proceeds to the next database entry in the pattern database, and back to block 304.

After each database entry has been processed by the coder, at block 314, the coder determines whether the coder has found a match in the pattern database. If the coder determines that the coder has found a match in the pattern database, the coder proceeds to block 316, where the coder signals the index of the match for the current pattern 301B (e.g., if the coder determines that pattern mode is to be used for the current block containing the current pattern 301B). Otherwise, the coder proceeds to blocks 318 and 320, where the coder determines whether the number of new patterns (e.g., new unique patterns) has exceeded a threshold value. If the coder determines that the number of new patterns has not exceeded the threshold value, the coder proceeds to block 322, where the current pattern is added to the database (e.g., in addition to signaling the current pattern in the bitstream). Otherwise, the coder proceeds to block 324, where the coder determines that pattern mode cannot be used to code the current block containing the current pattern 301B.

In the method 300, one or more of the blocks shown in FIG. 3 may be removed (e.g., not performed) and/or the order in which the method is performed may be switched. In some embodiments, additional blocks may be added to the method 300. The embodiments of the present disclosure are not limited to or by the example shown in FIG. 3, and other variations may be implemented without departing from the spirit of this disclosure.

Example Flowchart for Updating a Pattern Database

Figure 4:
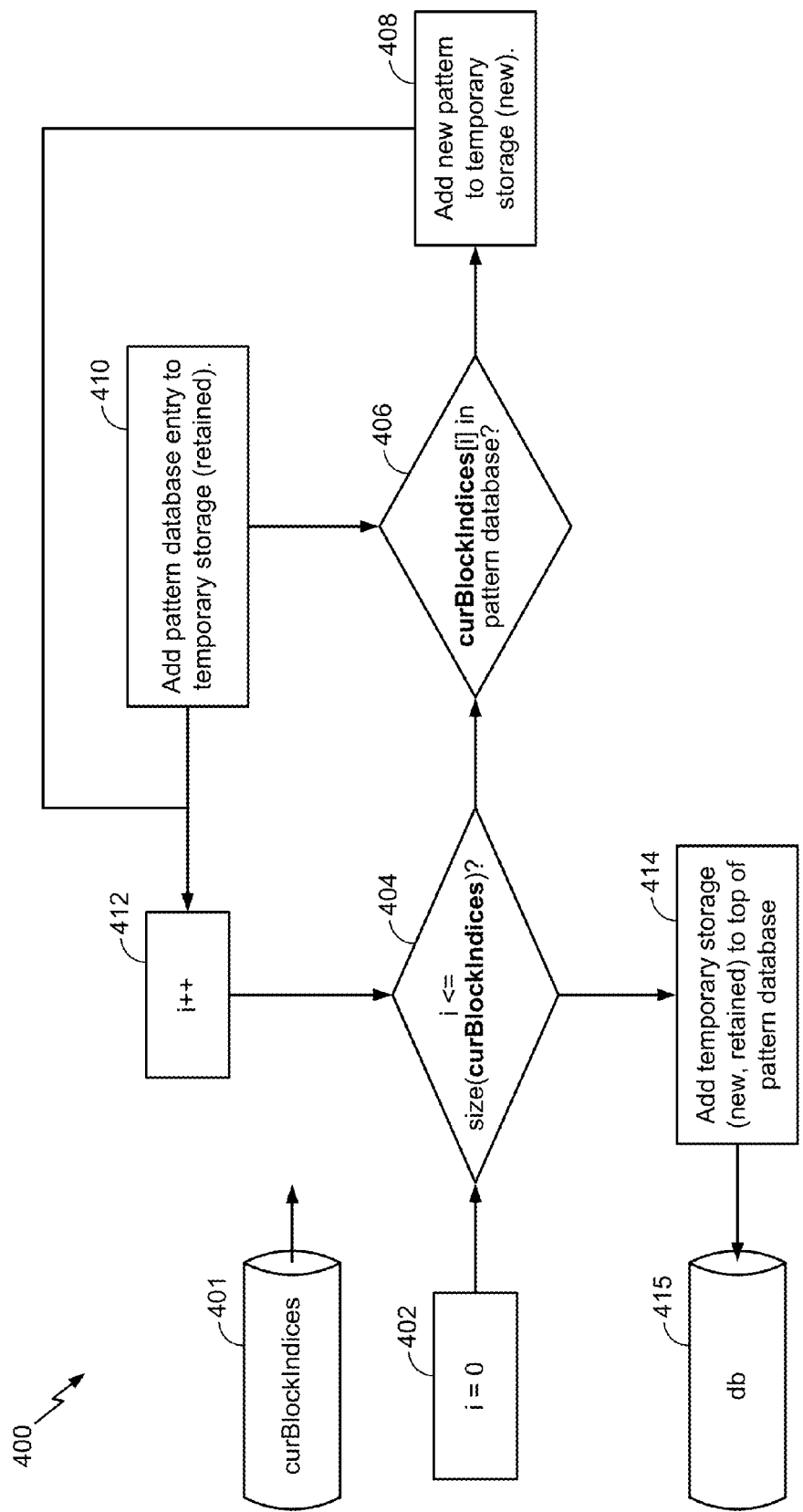
FIG. 4 is a flowchart illustrating a method for updating a pattern database in accordance with aspects described in this disclosure.

With reference to FIG. 4, an example procedure for updating a pattern database will be described. The steps illustrated in FIG. 4 may be performed by a video encoder (e.g., the video encoder 20 in FIG. 2A), a video decoder (e.g., the video decoder 30 in FIG. 2B), or component(s) thereof. For convenience, method 400 is described as performed by a video coder (also simply referred to as coder), which may be the video encoder 20, the video decoder 30, or another component.

The method 400 begins at block 402, where one or more parameters used in the method 400 are initialized. As illustrated in FIG. 4, the coder iterates through the indices of the current block (e.g., curBlockIndices 401, which may include a plurality of patterns in the current block) to update the pattern database 415 with the patterns from the current block. At block 404, the coder determines whether the coder has finished going through all the patterns in the current block. If the coder determines that the coder has not finished going through all the patterns in the current block, the coder proceeds to block 406, where the coder determines whether the current pattern is in the pattern database. If the coder determines that the current pattern is not in the pattern database, the coder proceeds to block 408, where the current pattern is added to the temporary storage as a new pattern. Otherwise, the coder proceeds to block 410, where the current pattern is added to the temporary storage as an existing pattern. The coder then proceeds to block 412 and back to block 404 to finish going through all the patterns in the current block. After the coder has finished going through all the patterns in the current block, at block 414, the patterns added to the temporary storage at blocks 408 and 410 are added to the top of the pattern database 415.

In the method 400, one or more of the blocks shown in FIG. 4 may be removed (e.g., not performed) and/or the order in which the method is performed may be switched. In some embodiments, additional blocks may be added to the method 400. The embodiments of the present disclosure are not limited to or by the example shown in FIG. 4, and other variations may be implemented without departing from the spirit of this disclosure.

Example Flowchart for Coding a Block in Pattern Mode

Figure 5:
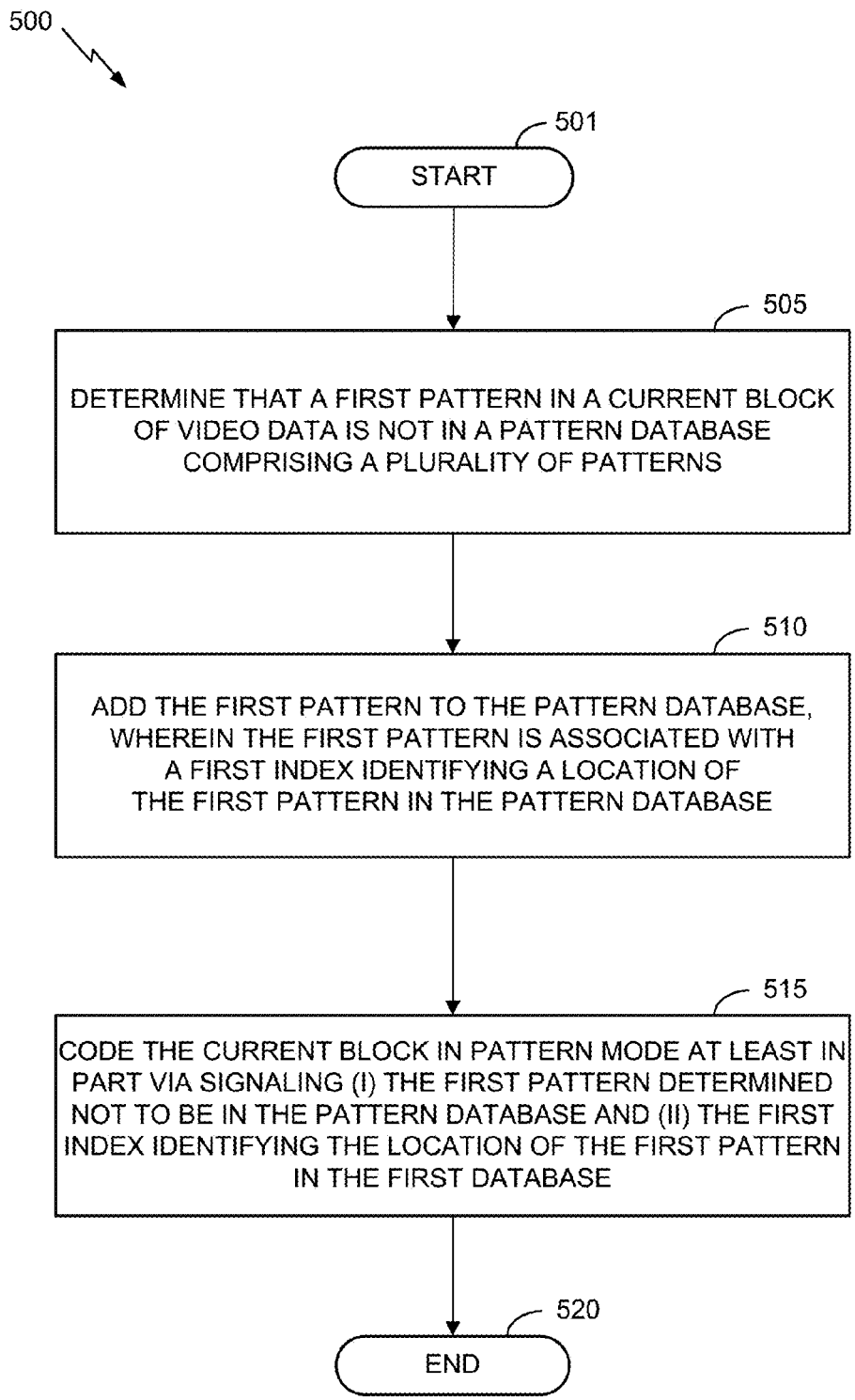
FIG. 5 is a flowchart illustrating a method for predicting a block of video data in pattern mode in accordance with aspects described in this disclosure.

With reference to FIG. 5, an example procedure for coding a block in pattern mode will be described. The steps illustrated in FIG. 5 may be performed by a video encoder (e.g., the video encoder 20 in FIG. 2A), a video decoder (e.g., the video decoder 30 in FIG. 2B), or component(s) thereof. For convenience, method 500 is described as performed by a video coder (also simply referred to as coder), which may be the video encoder 20, the video decoder 30, or another component.

The method 500 begins at block 501. At block 505, the coder determines that a first pattern in the current block of video data is not in the pattern database. As discussed above, the database may include a plurality of patterns. At block 510, the coder adds the first pattern to the pattern database. The first pattern added to the database may be associated with a database index that indicates where in the pattern database the first pattern is located. At block 515, the coder codes the current block in pattern mode at least in part via signaling (i) the first pattern determined not to be in the pattern database and (ii) the database index associated with the first pattern in the bitstream. For patterns that exist in the pattern database, only the database index may be signaled.

By signaling the database index (e.g., which may be represented in 5 bits if the pattern database has a size of 32 pattern entries) of existing patterns instead of the actual value of the pattern (e.g., 24 bits if 8-bit RGB values are used), bit savings may be achieved. The method 500 ends at block 520.

In the method 500, one or more of the blocks shown in FIG. 5 may be removed (e.g., not performed) and/or the order in which the method is performed may be switched. In some embodiments, additional blocks may be added to the method 500. The embodiments of the present disclosure are not limited to or by the example shown in FIG. 5, and other variations may be implemented without departing from the spirit of this disclosure.

Example Diagram for Updating a Pattern Database

Figure 6:
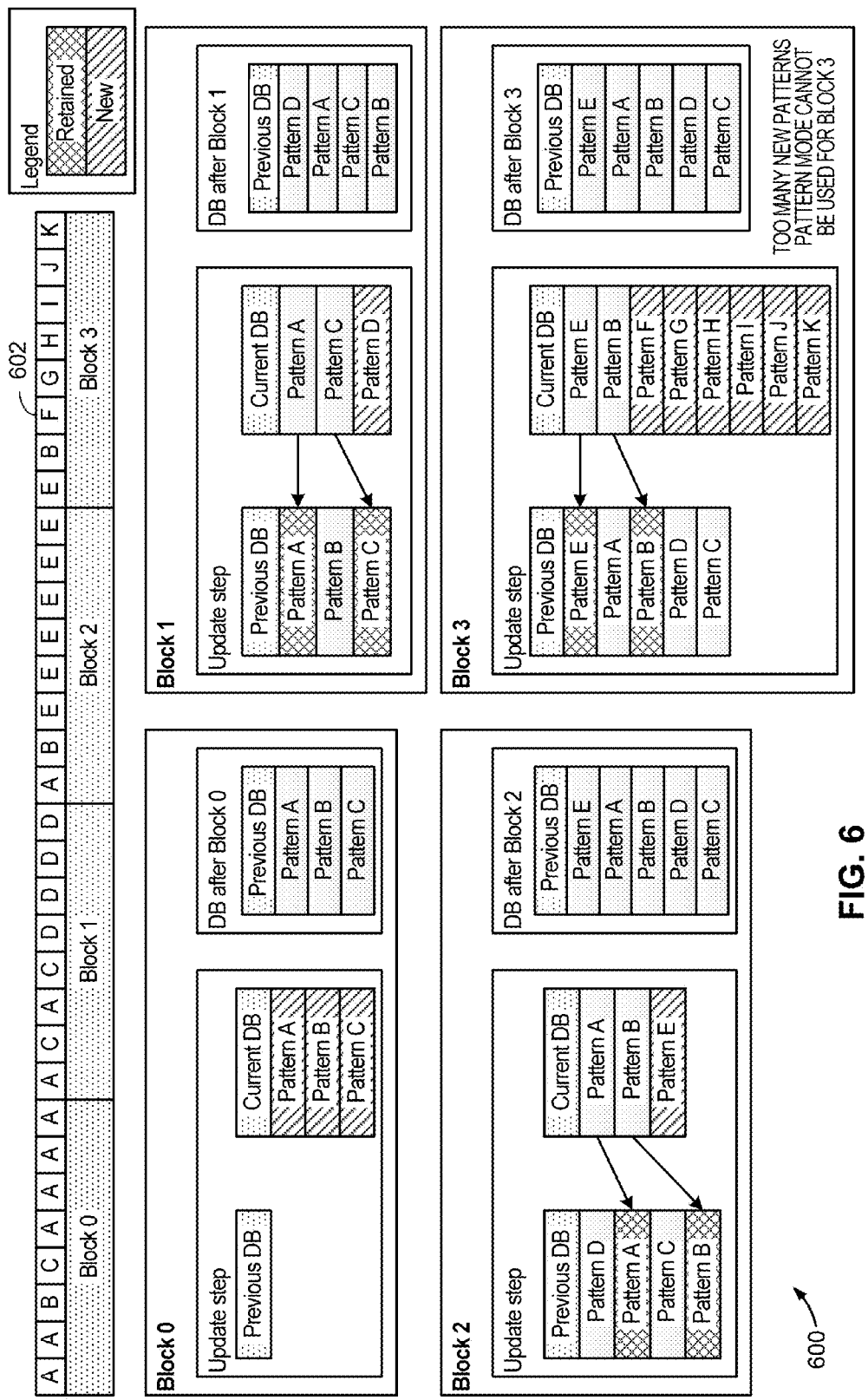
FIG. 6 is a block diagram illustrating a method for updating a pattern database in accordance with aspects described in this disclosure.

With reference to FIG. 6, an example procedure 600 for updating a pattern database will be described. In this example, each block consists of eight pixels. Patterns highlighted in yellow are considered as "new patterns" in the current block. Patterns highlighted in orange are considered as "retained patterns" which were found in the database during the search for the current block. As illustrated in FIG. 6, a current slice 602 contains blocks 0-3 that are being considered for being coded in pattern mode. Before block 0 is processed, the pattern database is empty. For example, the pattern database may be empty when the coder is processing the first block within a new slice. For this example, the maximum number of new patterns per block may be fixed at 4 in this example.

For block 0, the pattern database starts as empty, since this is the first block in the slice. Three unique pixel values are observed in block 0 (patterns A, B, C). Since the number of new patterns is less than the threshold value of 4, the current block can be coded using pattern mode with 3 new patterns signaled to the bitstream. If pattern mode is selected as the best mode by the rate control algorithm, the pattern database will be updated to include patterns A, B, and C.

Block 1 contains three unique patterns A, C, and D. Since the pattern database already contains patterns A and C, only pattern D need to be added to the pattern database (e.g., to the top of the pattern database). Since the number of new patterns is 1, block 1 can be coded using pattern mode with 1 new pattern signaled to the bitstream. Assuming that pattern mode is selected, the pattern database will now include: patterns A, B, C, and D. As shown in FIG. 6, patterns A and C are moved to the top of the pattern database since patterns A and C have also been recently used. By doing so, the most recently used patterns will persist in the database as long as possible, while the pattern entries that are discarded will be the least recently used.

Block 2 contains three unique patterns A, B, and E. Patterns A and B are found in the pattern database, and new pattern E is added to the pattern database. Similarly, the most recently used patterns (e.g., patterns A, B, and E) are placed at the top of the pattern database.

Block 3 has 8 unique patterns. Although the pattern database contains two of the unique patterns E and B, the remaining 6 patterns are not found in the pattern database. Since 6 exceeds the maximum number new patterns that may be added to the pattern database, which is 4 in this example, the coder may determine that block 3 cannot be coded in pattern mode, as indicated in FIG. 6. Since pattern mode cannot be selected by the rate control algorithm, the pattern database will be identical to the pattern database after block 2.

In some embodiments of the present disclosure, even if pattern mode is not selected for a given block, the new patterns in the given block may be added to the pattern database. For example, the patterns in the very first block of a slice may be added to the pattern database, even if that block is not being coded in pattern mode. In another example, the patterns in the first few blocks (e.g., a threshold number of blocks) of a slice may be added to the pattern database, even if such blocks are not being coded in pattern mode. In yet another example, the patterns in a given block that is not being coded in pattern mode may be added to the pattern database if the pattern database is not full (e.g., at least one new pattern may be added to the pattern database without having to remove any existing patterns in the pattern database).

Example Pattern Update Process for Encoder

Figure 7:
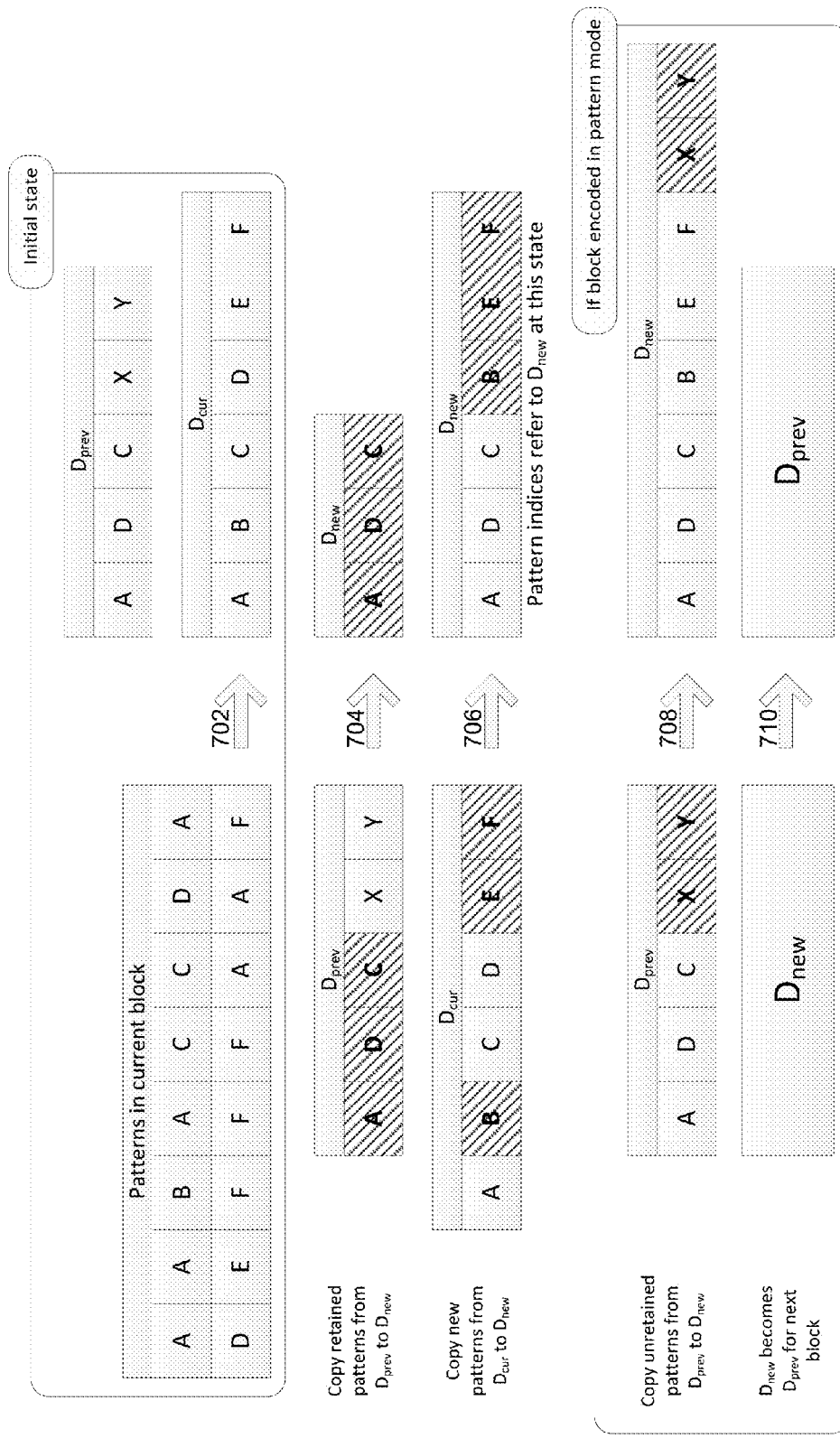
FIG. 7 is a block diagram illustrating a method performed by an encoder for updating a pattern database in accordance with aspects described in this disclosure.

With reference to FIG. 7, an example procedure for updating a pattern database on the encoder side will be described. In this example, the pattern database ($D_{prev}$) initially contains patterns A, D, C, X, and Y. At arrow 702, the patterns A, B, C, D, E, and F in the current block to the coded are added to a current database ($D_{curr}$). At arrow 704, patterns in the current block that are also in $D_{prev}$ are copied to a new database $D_{new}$. At arrow 706, patterns in the current block that are not in $D_{prev}$ are added to $D_{new}$. If the current block is encoded in pattern mode, patterns in $D_{prev}$ that are not in the current block are added to $D_{new}$ at arrow 708. At arrow 710, $D_{new}$ becomes the pattern database $D_{prev}$ for the next block.

Example Pattern Update Process for Decoder

Figure 8:
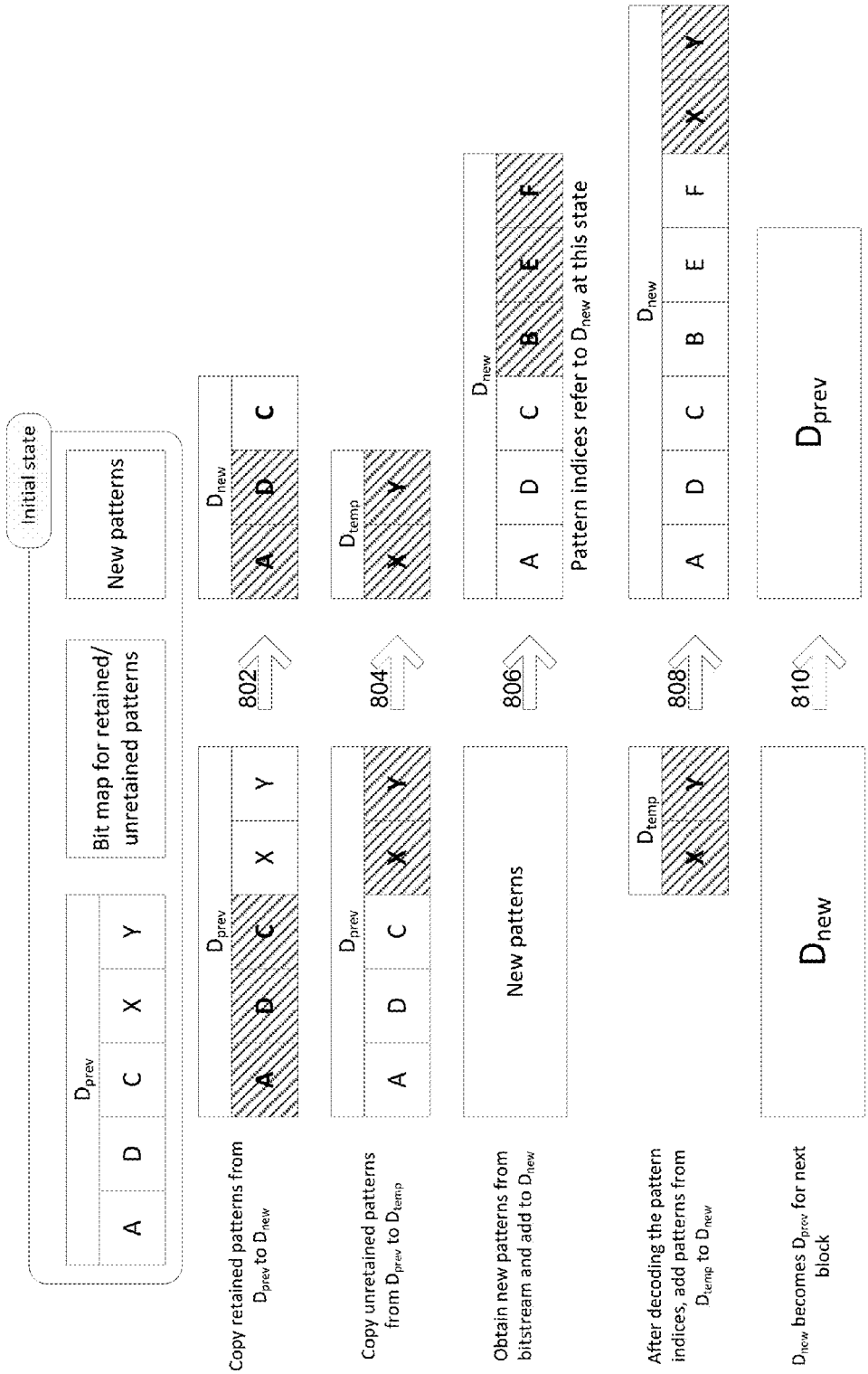
FIG. 8 is a block diagram illustrating a method performed by a decoder for updating a pattern database in accordance with aspects described in this disclosure.

With reference to FIG. 8, an example procedure for updating a pattern database on the decoder side will be described. In this example, the decoder initially has access to the pattern database, the bitmap for retained and unretained patterns, and the new patterns. At arrow 802, the retained patterns are copied from the pattern database to a new database $D_{new}$. At arrow 804, the unretained patterns are copied from the pattern database to a temporary database $D_{temp}$. At arrow 806, the new patterns signaled in the bitstream are obtained from the bitstream and added to $D_{new}$. At arrow 808, after decoding the pattern indices, the patterns in $D_{temp}$ are added to $D_{new}$. At arrow 810, $D_{new}$ becomes the pattern database $D_{prev}$ for the next block.

Other Pattern Database Techniques

In some embodiments of the present disclosure, the first m blocks in a slice may be added to the pattern database whether pattern mode is selected or not. For example, if the first block is coded using some other mode, then the reconstructed pixels may be added to the pattern database. This will not cause any collisions, since the pattern database is empty at the beginning of each slice.

The pattern mode techniques described in the present disclosure may be used in a codec supporting either one line buffer or multiple line buffers. This means that the default block size could be either one line (1-D) or multiple lines (2-D). In either case, each of the pixels within the block may be subject to the same constraints (e.g., each pixel should either match some entry in the pattern database or the total number of "new patterns" must be less than or equal to the maximum allowed per block).

Advantages

As discussed above, the pattern mode techniques described in the present disclosure may either be used in a lossless manner, or may allow some loss when searching the database for matches. In addition, if used in a lossy manner, the amount of loss accepted may be proportional to the current QP of the encoder. Further, asymmetric design allows for the pattern search to be performed on the encoder side, decreasing complexity of the decoder.

The relative size of the pattern database or portions thereof (e.g., persistent, neighbors, and new) may be tuned as a function of compression-rate, bit-depth, block size, and other codec parameters to optimize performance for a specific codec. For example, given a certain combination of block size and pattern database size, the neighbors portion of the database may be excluded to make more room for persistent patterns.

Additionally, the pattern mode techniques described in the present disclosure may result in low hardware complexity. The pattern update can be performed without requiring a search through the persistent database to enforce MRU. Instead, the database is only updated for pattern mode blocks, and only the new and neighboring patterns are added back into the persistent database.

Performance

Figure 9:
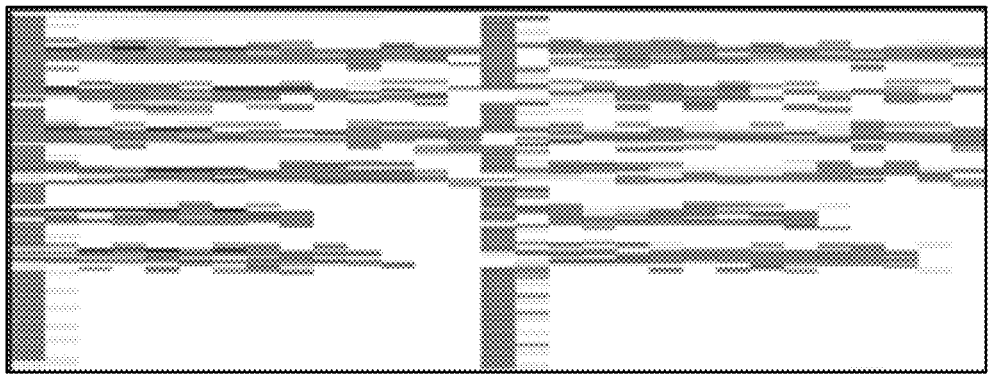
FIG. 9 is an example compressed image in which pattern mode is disabled.
Figure 10:
FIG. 10 is an example compressed image in which pattern mode is enabled in accordance with aspects described in this disclosure.

The performance of one or more embodiments of the present disclosure can best be demonstrated by examining content that may be difficult to code without using pattern mode. FIGS. 9 and 10 illustrate example image content that is coded with and without pattern mode, respectively. All examples shown use a fixed rate 4:1 compression. Objective quality is measured using Peak Signal to Noise Ratio (PSNR), which is a common objective metric for image quality.

The rate control mechanism of the codec described herein may be designed to select the best coding mode for each block based on the trade-off between rate and distortion. Therefore, the fact that pattern mode is selected for the majority of blocks in the content illustrated in FIG. 10 is an indication that pattern mode provides superior coding efficiency for this type of content.

The image content shown in FIG. 9, in which pattern mode was disabled, has a PSNR of 36.76 dB. The image content includes, from top to bottom, a reconstructed image, a per-block mode selection map, and a zoomed-in region of reconstructed image. The image content shown in FIG. 10, in which pattern mode was enabled, has a PSNR of 44.14 dB. The image content includes, from top to bottom, a reconstructed image, a per-block mode selection map, and a zoomed-in region of reconstructed image.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. A method for coding video data in pattern mode, comprising:
   determining that a first pattern in a current block of video data is not in a pattern database comprising a plurality of patterns usable to code one or more blocks of video data in a pattern mode, wherein the pattern database is stored in a memory of a video encoding device;
   adding the first pattern to the pattern database, the first pattern being associated with a first index identifying a location of the first pattern in the pattern database;
   coding the current block in the pattern mode at least in part via signaling (i) the first pattern determined not to be in the pattern database and (ii) the first index identifying the location of the first pattern in the first database;
   determining that a second pattern in a second block of video data is not in the pattern database;
   adding the second pattern to the pattern database, the second pattern being associated with a second index identifying a location of the second pattern in the pattern database; and
   coding the second block in a coding mode that is different from the pattern mode.

2. The method of claim 1, wherein determining that the first pattern is not in the pattern database comprises:
   iterating through each of the plurality of patterns in the pattern database; and
   determining that each pattern in the pattern database is not identical to the first pattern in the current block.

3. The method of claim 1, wherein determining that the first pattern is not in the pattern database comprises:
   iterating through each of the plurality of patterns in the pattern database; and
   determining that a difference between each pattern in the pattern database and the first pattern in the current block exceeds a threshold difference value.

4. The method of claim 1, further comprising:
   determining one or more retained patterns that are in both the current block and the pattern database;
   determining one or more new patterns that are in the current block but not in the pattern database;
   determining one or more unretained patterns that are in the pattern database but not in the current block; and
   creating a new pattern database based on the retained, new, and unretained patterns.

5. The method of claim 1, wherein adding the first pattern to the pattern database comprises adding the first pattern to a location in the pattern database that represents a pattern that is the most recently used pattern in the pattern database.

6. The method of claim 1, wherein determining that the first pattern is not in the pattern database comprises, for each pattern in the pattern database, at least one of (i) determining that a difference between at least one component of the first pattern and the pattern in the pattern database exceeds a first threshold value, or (ii) determining that a sum of a difference between each component of the first pattern and a corresponding component of the pattern in the database exceeds a second threshold value.

7. The method of claim 6, wherein the first and second threshold values are fixed.

8. The method of claim 6, wherein the first and second threshold values are determined based on a quantization parameter associated with the current block.

9. The method of claim 1, wherein adding the second pattern to the pattern database comprises:
    determining whether the second block satisfies one or more threshold criteria; and
    based on a determination that the second block satisfies the one or more threshold criteria, adding the second pattern to the pattern database.

10. The method of claim 9, wherein the one or more threshold criteria comprise one of (i) whether the second block does not have any preceding blocks in the same slice, (ii) whether the second block is in a group of consecutive blocks that does not have any preceding blocks in the same slice, or (iii) whether the pattern database is not full.

11. The method of claim 1, wherein the first pattern is signaled in a lossless manner using a source bit depth at which the first pattern was captured.

12. The method of claim 1, wherein the first pattern is signaled in a lossy manner, wherein the first pattern is quantized by an amount based on a quantization parameter associated with the current block, the quantized first pattern having a bit depth that is lower than a source bit depth at which the first pattern was captured.

13. The method of claim 1, further comprising coding the second block in the coding mode different from the pattern mode based on determining that an amount of distortion associated with the pattern mode is greater than that associated with the coding mode different from the pattern mode.

14. An apparatus configured to code video data in pattern mode, comprising:
    a memory configured to store a pattern database comprising a plurality of patterns usable to code one or more blocks of video data in a pattern mode; and
    a processor in communication with the memory and configured to:
        determine that a first pattern in a current block of video data is not in the pattern database;
        add the first pattern to the pattern database, the first pattern being associated with a first index identifying a location of the first pattern in the pattern database;
        code the current block in the pattern mode at least in part via signaling (i) the first pattern determined not to be in the pattern database and (ii) the first index identifying the location of the first pattern in the first database;
        determine that a second pattern in a second block of video data is not in the pattern database;
        add the second pattern to the pattern database, the second pattern being associated with a second index identifying a location of the second pattern in the pattern database; and
        code the second block in a coding mode that is different from the pattern mode.

15. The apparatus of claim 14, wherein the processor is further configured to:
    iterate through each of the plurality of patterns in the pattern database; and
    determine that each pattern in the pattern database is not identical to the first pattern in the current block.

16. The apparatus of claim 14, wherein the processor is further configured to:
    iterate through each of the plurality of patterns in the pattern database; and
    determine that a difference between each pattern in the pattern database and the first pattern in the current block exceeds a threshold difference value.

17. The apparatus of claim 14, wherein the processor is further configured to:
    for each pattern in the current block:
        determine whether the pattern is in the pattern database;
        based on a determination that the pattern is in the pattern database, add a corresponding pattern database entry to a temporary storage;
        based on a determination that the pattern is not in the pattern database, add the pattern to the temporary storage; and
    add patterns in the temporary storage to the pattern database.

18. The apparatus of claim 14, wherein the processor is further configured to add the first pattern to a location in the pattern database that represents a pattern that is the most recently used pattern in the pattern database.

19. The apparatus of claim 14, wherein the processor is further configured to, for each pattern in the pattern database, at least one of (i) determine that a difference between at least one component of the first pattern and the pattern in the pattern database exceeds a first threshold value, or (ii) determine that a sum of a difference between each component of the first pattern and a corresponding component of the pattern in the database exceeds a second threshold value.

20. The apparatus of claim 19, wherein the first and second threshold values are fixed.

21. The apparatus of claim 19, wherein the first and second threshold values are determined based on a quantization parameter associated with the current block.

22. The apparatus of claim 14, wherein the processor is further configured to:
    determine whether the second block satisfies one or more threshold criteria; and
    based on a determination that the second block satisfies the one or more threshold criteria, add the second pattern to the pattern database.

23. The apparatus of claim 22, wherein the one or more threshold criteria comprise one of (i) whether the second block does not have any preceding blocks in the same slice, (ii) whether the second block is in a group of consecutive blocks that does not have any preceding blocks in the same slice, or (iii) whether the pattern database is not full.

24. The apparatus of claim 14, wherein the processor is further configured to signal the first pattern in a lossless manner using a source bit depth at which the first pattern was captured.

25. The apparatus of claim 14, wherein the processor is further configured to signal the first pattern in a lossy manner, wherein the first pattern is quantized by an amount based on a quantization parameter associated with the current block, the quantized first pattern having a bit depth that is lower than a source bit depth at which the first pattern was captured.

26. A non-transitory computer readable medium comprising code that, when executed, causes an apparatus to:
    determine that a first pattern in a current block of video data is not in a pattern database comprising a plurality of patterns usable to code one or more blocks of video data in a pattern mode;
    add the first pattern to the pattern database, the first pattern being associated with a first index identifying a location of the first pattern in the pattern database;
    code the current block in the pattern mode at least in part via signaling (i) the first pattern determined not to be in the pattern database and (ii) the first index identifying the location of the first pattern in the first database;

determine that a second pattern in a second block of video data is not in the pattern database;

add the second pattern to the pattern database, the second pattern being associated with a second index identifying a location of the second pattern in the pattern database; and code the second block in a coding mode that is different from the pattern mode.

27. The apparatus of claim 14, wherein the processor is further configured to code the second block in the coding mode different from the pattern mode based on a determination that an amount of distortion associated with the pattern mode is greater than that associated with the coding mode different from the pattern mode.

28. The computer readable medium of claim 26, wherein the code further causes the apparatus to add the first pattern to a location in the pattern database that represents a pattern that is the most recently used pattern in the pattern database.

29. A video coding device configured to code video data in pattern mode, the video coding device comprising:

means for determining that a first pattern in a current block of video data is not in a pattern database comprising a plurality of patterns usable to code one or more blocks of video data in a pattern mode;

means for adding the first pattern to the pattern database, the first pattern being associated with a first index identifying a location of the first pattern in the pattern database;

means for coding the current block in the pattern mode at least in part via signaling (i) the first pattern determined not to be in the pattern database and (ii) the first index identifying the location of the first pattern in the first database;

means for determining that a second pattern in a second block of video data is not in the pattern database;

means for adding the second pattern to the pattern database, the second pattern being associated with a second index identifying a location of the second pattern in the pattern database; and means for coding the second block in a coding mode that is different from the pattern mode.

30. The video coding device of claim 29, further comprising means for adding the first pattern to a location in the pattern database that represents a pattern that is the most recently used pattern in the pattern database.

* * * * *